US012031597B2

(12) United States Patent
Nogami et al.

(10) Patent No.: US 12,031,597 B2
(45) Date of Patent: Jul. 9, 2024

(54) BRAKE DISK UNIT FOR RAILWAY VEHICLE

(71) Applicant: NIPPON STEEL CORPORATION, Tokyo (JP)

(72) Inventors: Hiroshi Nogami, Tokyo (JP); Takahiro Fujimoto, Tokyo (JP); Yuiko Shiotani, Tokyo (JP); Ryuichi Nishimura, Tokyo (JP); Mitsuhiro Okamoto, Tokyo (JP); Kumpei Sano, Tokyo (JP); Naruo Miyabe, Tokyo (JP); Yuki Ichikawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 311 days.

(21) Appl. No.: 17/753,535

(22) PCT Filed: Sep. 9, 2020

(86) PCT No.: PCT/JP2020/034076
§ 371 (c)(1),
(2) Date: Mar. 7, 2022

(87) PCT Pub. No.: WO2021/065392
PCT Pub. Date: Apr. 8, 2021

(65) Prior Publication Data
US 2022/0333656 A1 Oct. 20, 2022

(30) Foreign Application Priority Data

Sep. 30, 2019 (JP) .................................. 2019-178274
Apr. 14, 2020 (JP) .................................. 2020-072438

(51) Int. Cl.
*F16D 65/12* (2006.01)
*B61H 5/00* (2006.01)
(Continued)

(52) U.S. Cl.
CPC ............. *F16D 65/128* (2013.01); *B61H 5/00* (2013.01); *F16D 65/847* (2013.01); *F16D 2065/1332* (2013.01)

(58) Field of Classification Search
CPC ......... F16D 65/123–128; F16D 65/847; F16D 2065/1332; B61H 5/00
(Continued)

(56) References Cited

U.S. PATENT DOCUMENTS 11,480,223 B2* 10/2022 Kondo ................ F16D 65/0006
2011/0214950 A1* 9/2011 Fujimoto ................ B61H 5/00
188/218 XL
2019/0178317 A1 6/2019 Shiraishi et al.

FOREIGN PATENT DOCUMENTS

| JP | 2007205428 A | 8/2007 |
| WO | 2010071169 A1 | 6/2010 |
| WO | 2017099074 A1 | 6/2017 |

* cited by examiner

*Primary Examiner* — Christopher P Schwartz
(74) *Attorney, Agent, or Firm* — Greer Burns & Crain Ltd.

(57) ABSTRACT

A brake disk unit includes a rotating member, a brake disk, and a control member. The brake disk includes a disk main body, fins, and convex portions and/or concave portions. The control member includes a support portion and a projecting portion. At least a part of the projecting portion is arranged between fins that are adjacent in the circumferential direction of the brake disk. A gap is formed between the projecting portion and the brake disk. On the surface of the brake disk, the convex portions and/or the concave portions are provided further on the outer side in the radial direction of the brake disk than a minimum opening portion of the gap.

10 Claims, 9 Drawing Sheets

(51) Int. Cl.
*F16D 65/847* (2006.01)
*F16D 65/02* (2006.01)

(58) Field of Classification Search
USPC .................. 188/218 XL, 264 A, 264 AA
See application file for complete search history.

BRAKE DISK UNIT FOR RAILWAY VEHICLE

TECHNICAL FIELD

The present disclosure relates to a brake disk unit for a railway vehicle.

BACKGROUND ART

Disk brake devices are widely used as braking devices of railway vehicles. A disk brake device includes an annular brake disk and a brake lining. The brake disk, for example, is fastened to a wheel, and rotates together with the wheel. The brake lining is pressed against the brake disk. Friction between the brake lining and the brake disk applies a braking force to the brake disk and the wheel.

For example, in railway vehicles which travel at high speeds such as the Shinkansen train (also known as the Japanese "Bullet Train"), the brake disk of the disk brake device is required to have sufficient cooling performance from the viewpoint of securing the durability thereof. In particular, during a period in which a high-speed railway vehicle is traveling on a downhill section, braking by the brake disks is performed intermittently. At such time, if the cooling performance of the brake disk is insufficient, the temperature of the brake disk will become high, and as a result the durability of the brake disk will be impaired. In addition, if the brake disk undergoes thermal expansion due to the high temperature, the load on the bolts that fasten the brake disk to the wheel will increase.

In general, to secure the cooling performance during braking, a plurality of fins are formed in a radial shape on the rear surface of the brake disk. Each fin contacts the wheel and forms a ventilation passage between the rear surface of the brake disk and the wheel. When the brake disk rotates with the wheel, the ventilation passage allows air to pass from the inner circumferential side toward the outer circumferential side of the brake disk to thereby cool the brake disk. However, aerodynamic sound is generated by the flow of air in the ventilation passage. In particular, when a railway vehicle travels at high speed, the airflow rate in the ventilation passage increases and a large aerodynamic sound is generated.

Accompanying the strengthening of environmental regulations in recent years, with regard to railway vehicles, increased importance has been placed on quietness while traveling at a high speed. Consequently, even for disk brake devices, it is necessary to reduce as much as possible the aerodynamic sound generated when a railway vehicle is traveling.

For example, Patent Literature 1 proposes technology in which connecting portions each of that connects together fins which are adjacent in the circumferential direction are provided in a disk brake device. By means of the connecting portions, a portion where the cross-sectional area is smallest is formed in each ventilation passage defined by adjacent fins. According to Patent Literature 1, by making the sum total of the minimum cross-sectional areas of the ventilation passages 18,000 $mm^2$ or less, the aerodynamic sound when traveling at a high speed can be reduced.

CITATION LIST

Patent Literature

Patent Literature 1: Japanese Patent Application Publication No. 2007-205428

SUMMARY OF INVENTION

Technical Problem

In Patent Literature 1, by using a connecting portion to connect fins together, the cross-sectional area of each ventilation passage is partially reduced to thereby limit the airflow rate within the ventilation passage. However, when the airflow rate is limited, the flow velocity of air flowing along the surface of the brake disk decreases, and consequently the cooling performance of the brake disk during braking decreases. Further, in Patent Literature 1, because the connecting portion is provided on the rear surface side of the brake disk, a smallest cross-sectional area portion of the ventilation passage is formed on the wheel side. Hence, air that has passed through the smallest cross-sectional area portion moves away from the brake disk and is guided so as to flow along the surface of the wheel. As a result, there is a possibility that the cooling performance of the brake disk during braking will further decrease.

An object of the present disclosure is to provide a brake disk unit for a railway vehicle which can secure cooling performance of the brake disk during braking while also reducing aerodynamic sound that is generated while the railway vehicle is traveling.

Solution to Problem

A brake disk unit according to the present disclosure is a brake disk unit for a railway vehicle. The brake disk unit includes a rotating member, a brake disk, and a control member. The rotating member is mounted to an axle of the railway vehicle. The brake disk includes an annular disk main body, a plurality of fins, and a plurality of first convex portions and/or a plurality of first concave portions. The disk main body has a rear surface that faces the rotating member. The plurality of fins are arranged in a radial shape on the rear surface. The plurality of first convex portions and/or the plurality of first concave portions are formed on a surface of the brake disk. The control member includes a plate-shaped support portion and a projecting portion. The support portion is interposed between the rotating member and the plurality of fins. At least a part of the projecting portion is arranged between fins that are adjacent in a circumferential direction of the brake disk among the plurality of fins. The projecting portion projects from the support portion toward the disk main body. The control member controls an airflow rate between the fins that are adjacent. A gap is formed between the projecting portion and the brake disk. On the surface of the brake disk, the first convex portions and/or first concave portions are provided further on an outer side in a radial direction of the brake disk than a minimum opening portion. The minimum opening portion is a portion of the aforementioned gap at which an area of a cross section along the circumferential direction is smallest.

Advantageous Effects of Invention

According to the brake disk unit for a railway vehicle of the present disclosure, the cooling performance of a brake disk during braking can be secured while also reducing aerodynamic sound that is generated while the railway vehicle is traveling.

DESCRIPTION OF EMBODIMENTS

A brake disk unit according to an embodiment is a brake disk unit for a railway vehicle. The brake disk unit includes a rotating member, a brake disk, and a control member. The rotating member is mounted to an axle of a railway vehicle. The brake disk includes an annular disk main body, a plurality of fins, and a plurality of first convex portions and/or a plurality of first concave portions. The disk main body has a rear surface that faces the rotating member. The plurality of fins are arranged in a radial shape on the rear surface. The plurality of first convex portions and/or the plurality of first concave portions are formed on a surface of the brake disk. The control member includes a plate-shaped support portion and a projecting portion. The support portion is interposed between the rotating member and the plurality of fins. At least a part of the projecting portion is arranged between fins that are adjacent in the circumferential direction of the brake disk among the plurality of fins. The projecting portion projects from the support portion toward the disk main body. The control member controls an airflow rate between adjacent fins. A gap is formed between the projecting portion and the brake disk. On the surface of the brake disk, the first convex portions and/or first concave portions are provided further on an outer side in a radial direction of the brake disk than a minimum opening portion. The minimum opening portion is a portion of the aforementioned gap at which an area of a cross section along the circumferential direction is smallest (first configuration).

According to the brake disk unit of the first configuration, an airflow rate between fins that are adjacent in the circumferential direction can be controlled by a control member. Specifically, according to the first configuration, because at least a part of a projecting portion of the control member is arranged between adjacent fins, the area of an opening in a ventilation passage which these fins form together with the disk main body and the rotating member partially decreases. By this means, the airflow rate within the ventilation passage can be limited, and aerodynamic sound that is generated when the railway vehicle is traveling can be reduced.

On the other hand, in the first configuration, the control member that is a separate member from the brake disk is interposed between the rotating member and the fins, and a projecting portion is caused to project from the rotating member side toward the disk main body. Therefore, the gap between the projecting portion of the control member and the brake disk is formed on the disk main body side and the fins side, and not on the rotating member side. By this means, air that passed through a minimum opening portion of the gap flows along the brake disk, and consequently the flow velocity of air near the surface of the brake disk can be increased. Hence, a decrease in the cooling performance of the brake disk during braking can be suppressed.

Moreover, in the first configuration, on the surface of the brake disk, a plurality of first convex portions and/or a plurality of first concave portions are provided at a location that is further on the outer side in the radial direction than the minimum opening portion of the gap between the projecting portion of the control member and the brake disk. By this means, in a region that is further on the wake side than the minimum opening portion, that is, in a region in which the flow velocity of air near the surface of the brake disk is high, a thermal boundary layer formed on the surface of the brake disk can be made thin, and the heat transfer coefficient between the air and the brake disk can be increased. Therefore, the cooling performance of the brake disk during braking can be maintained at a high level.

Thus, according to the first configuration, the cooling performance of the brake disk during braking can be secured while reducing aerodynamic sound that is generated when the railway vehicle is traveling.

The first convex portions and/or the first concave portions are preferably provided on the rear surface of the disk main body (second configuration).

A groove may be formed in each of the fins that are adjacent in the circumferential direction of the brake disk, the groove transecting the fin in the circumferential direction. In this case, the projecting portion can pass through the groove and extend in the circumferential direction from one of the fins that are adjacent to the other of the fins that are adjacent (third configuration).

For example, in a case where the whole of the projecting portion is arranged between fins that are adjacent in the circumferential direction of the brake disk, when producing the control member that is a separate member from the brake disk, it is necessary to strictly adjust the position and dimensions in the circumferential direction and the like of the projecting portion so that the projecting portion does not interfere with the fins. In contrast, in the third configuration, a groove in which it is possible to accommodate a part of the projecting portion is formed in each of the adjacent fins. Therefore, when producing the control member, it is not particularly necessary to take into consideration interference between the projecting portion and the fins, and strict adjustment of the position or dimensions in the circumferential direction or the like of the projecting portion is unnecessary. Hence, production of the control member can be performed relatively simply, and the labor and cost required for processing the control member can be reduced.

Preferably, the first convex portions are provided on the surface of the brake disk (fourth configuration).

The brake disk may further include a plurality of second convex portions and/or a plurality of second concave portions. The plurality of second convex portions and/or the plurality of second concave portions are formed on the surface of the brake disk. On the surface of the brake disk, these second convex portions and/or second concave portions can be provided at a position that is further on an inner side in the radial direction than the minimum opening portion (fifth configuration).

Hereunder, embodiments of the present disclosure are described while referring to the accompanying drawings. In the drawings, the same reference symbols are assigned to the same or equivalent parts, and a description thereof is not repeated.

First Embodiment

[Configuration of Brake Disk Unit]

Figure 1:
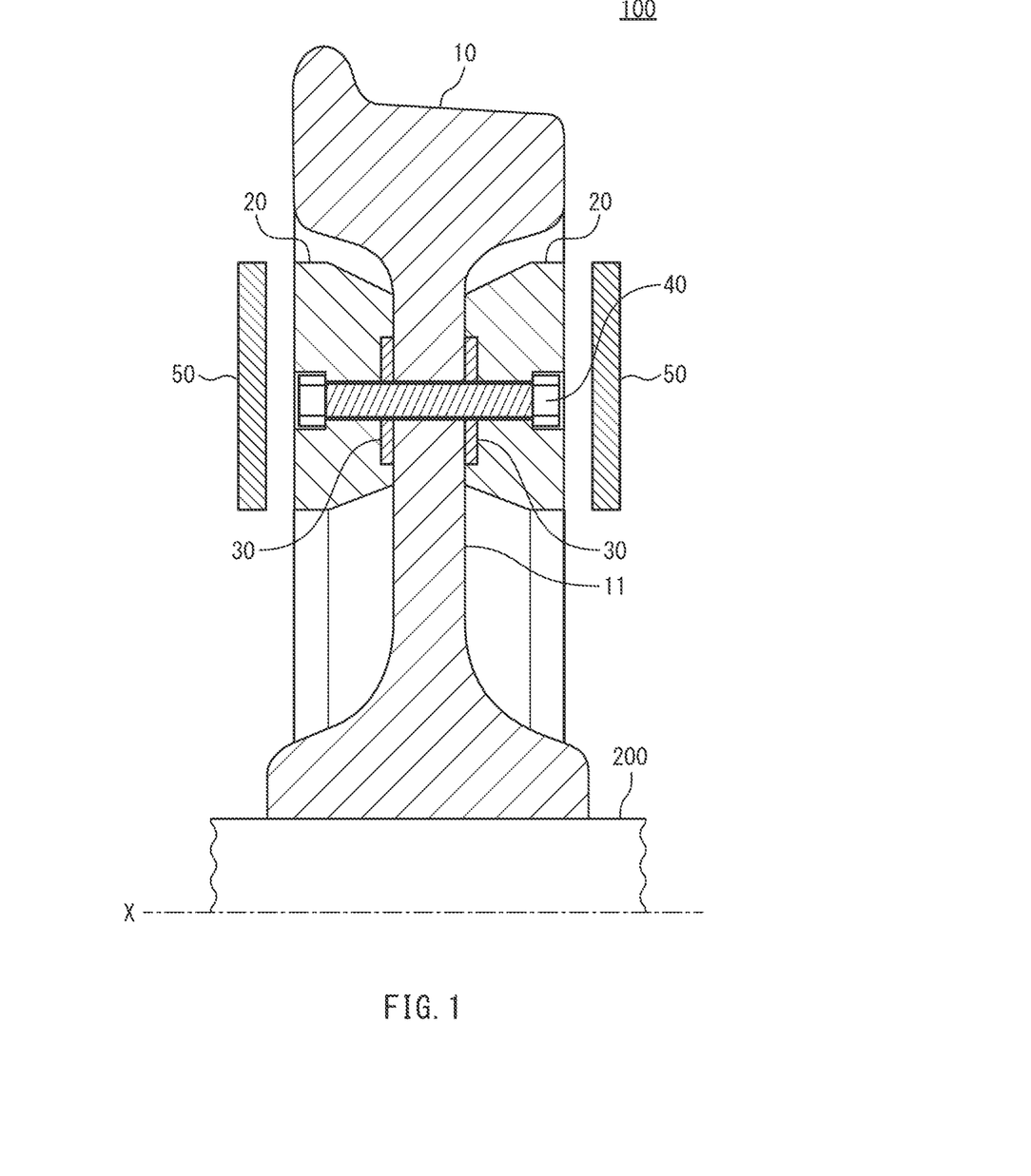
FIG. 1 is a longitudinal cross-sectional view illustrating the schematic configuration of a brake disk unit for a railway vehicle according to a first embodiment.

FIG. 1 is a longitudinal cross-sectional view illustrating the schematic configuration of a brake disk unit 100 for a railway vehicle according to a first embodiment. The term "longitudinal cross-section" refers to a cross section of the brake disk unit 100 taken along a plane including a central axis X. The central axis X is the axial centerline of an axle 200 of the railway vehicle. Hereunder, the direction in which the central axis X extends is referred to as the "axial direction".

As illustrated in FIG. 1, the brake disk unit 100 includes a rotating member 10, a brake disk 20, and a control member 30.

The rotating member 10 is mounted to the axle 200 and rotates around the central axis X integrally with the axle 200. In the example of the present embodiment, the rotating member 10 is a wheel of a railway vehicle. However, the rotating member 10 may be a disk body other than a wheel.

Brake disks 20 are provided on both side faces of the rotating member 10. These brake disks 20, for example, are each fastened to a plate portion 11 of the rotating member 10 that is a wheel by a fastening member 40 including a bolt and a nut. A brake lining 50 is provided on the outer side of each of the brake disks 20 in the axial direction. The control member 30 is arranged between the rotating member 10 and each of the brake disks 20.

Figure 2:
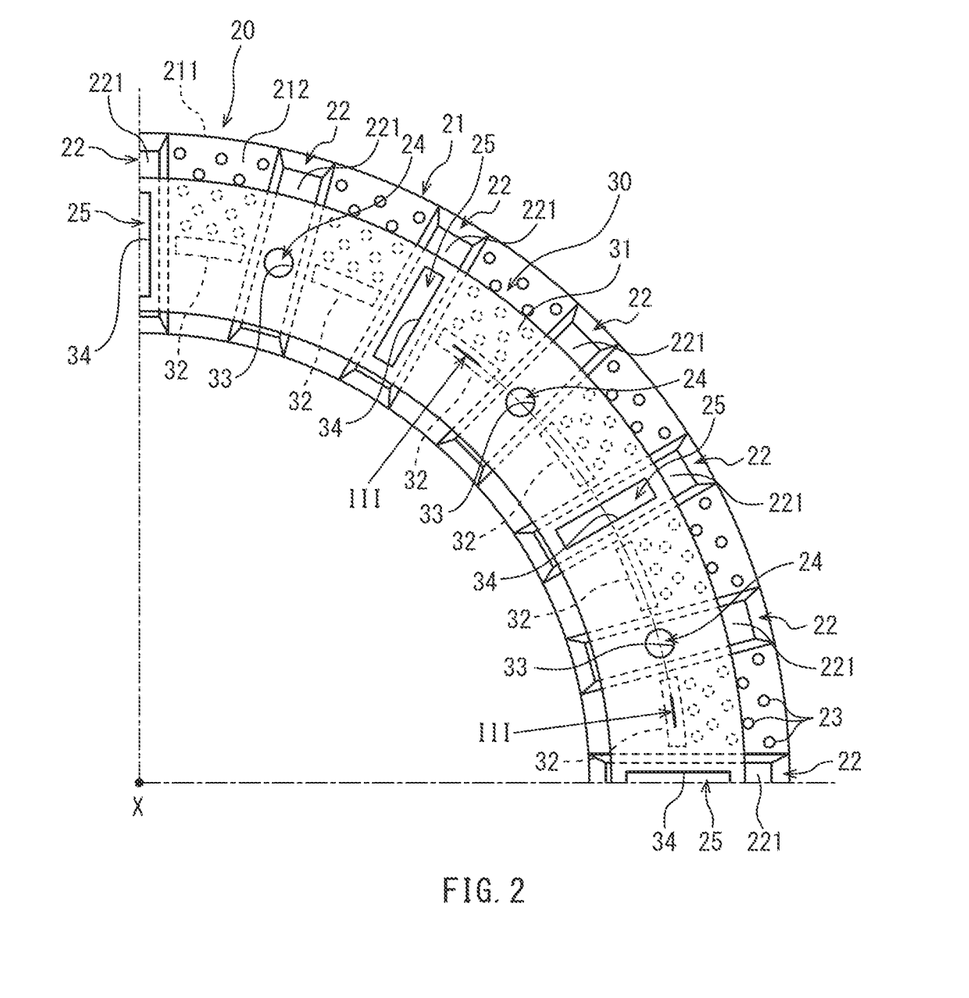
FIG. 2 is a rear surface view of a brake disk and a control member included in the brake disk unit illustrated in FIG. 1.

FIG. 2 is a view (rear surface view) in which, of the brake disks 20 and the control members 30 provided on both side faces of the rotating member 10, one brake disk 20 and one control member 30 are viewed from the rotating member 10 side. In FIG. 2, a portion that is one quarter of the circumference of the brake disk 20 and the control member 30 is illustrated. Hereinafter, the circumferential direction and the radial direction of the brake disk 20 and the control member 30 are referred to simply as "the circumferential direction" and "the radial direction".

Referring to FIG. 2, the brake disk 20 includes a disk main body 21, a plurality of fins 22, and a plurality of convex portions 23.

The disk main body 21 has an annular shape. The disk main body 21 has a substantially annular plate shape with the central axis X as an axial centerline. The disk main body 21 has a sliding surface (front surface) 211 and a rear surface 212. The sliding surface 211 is a surface provided on one side in the axial direction of the disk main body 21. The brake lining 50 (FIG. 1) is pressed against the sliding surface 211 to generate a braking force. The rear surface 212 is a surface provided on the other side in the axial direction of the disk main body 21, and faces the rotating member 10 (FIG. 1).

The plurality of fins 22 are arranged in a radial shape on the rear surface 212 of the disk main body 21. The fins 22 extend from the inner side to the outer side of the disk main body 21 in the radial direction. Each of the fins 22 projects from the rear surface 212 to the rotating member 10 (FIG. 1) side. As a result, spaces are formed between the rotating member 10, the fins 22 that are adjacent in the circumferential direction, and the disk main body 21. These spaces serve as ventilation passages which air passes through when the brake disk 20 rotates together with the rotating member 10.

In the present embodiment, in some of the fins 22 a fastening hole 24 is formed that penetrates through the relevant fin 22 and the disk main body 21. A concave key groove 25 is formed in a top face 221 of the other fins 22. The fastening member 40 (FIG. 1) is inserted into each of the fastening holes 24. A key (not illustrated) for restricting relative rotation between the brake disk 20 and the rotating member 10 (FIG. 1) is inserted into each of the key grooves 25. The number of the fins 22, the number of the fastening holes 24, and the number of the key grooves 25 can be set as appropriate. Although in the example of the present embodiment one among the fastening hole 24 and the key groove 25 is formed in all of the fins 22, there may be fins 22 in which neither one of the fastening hole 24 and the key groove 25 is formed.

A plurality of the convex portions 23 are provided between each of the fins 22 that are adjacent in the circumferential direction. The plurality of convex portions 23 are formed on the rear surface 212 of the disk main body 21. Each of the convex portions 23 has, for example, a hemispherical shape or a semispheroidal shape. Each convex portion 23 may have the same shape as the other convex portions 23, or may have a different shape to the other convex portions 23.

The control member 30 is a separate member from the brake disk 20, and controls the airflow rate between the fins 22 that are adjacent in the circumferential direction. The control member 30 includes a plate-shaped support portion 31 and a plurality of projecting portions 32.

In the example of the present embodiment, the support portion 31 has a substantially annular plate shape, and is arranged substantially coaxial with the disk main body 21. The support portion 31 is interposed between the rotating member 10 (FIG. 1) and the plurality of fins 22. For example, a recess corresponding to the support portion 31 can be formed in the top face 221 of the respective fins 22, and the support portion 31 can be arranged in the recess. Alternatively, the support portion 31 may be simply arranged between the top face 221 of the respective fins 22 which have not been processed and the rotating member 10. In the example of the present embodiment, the length of the support portion 31 in the radial direction is shorter than the length of the top face 221 of the respective fins 22. However, the length of the support portion 31 in the radial direction may be longer than the length of the top face 221 of the respective fins 22, or may be about the same as the length of the top face 221 of the respective fins 22.

In the support portion 31, a plurality of openings 33 are formed in correspondence with the fastening holes 24 of the brake disk 20 in order to insert the fastening members 40 (FIG. 1) into the support portion 31. Further, in order to insert the aforementioned keys (not illustrated) into the support portion 31, a plurality of openings 34 are formed in correspondence with the key grooves 25 of the brake disk 20 into the support portion 31.

Of the two faces of the plate-shaped support portion 31, the plurality of projecting portions 32 are formed on the face on the brake disk 20 side. The plurality of projecting portions 32 are provided at intervals in the circumferential direction. By this means, one projecting portion 32 is arranged between each of the fins 22 that are adjacent in the circumferential direction. Each of the projecting portions 32 projects from the support portion 31 toward the disk main body 21. These projecting portions 32 may be formed integrally with the support portion 31. For example, the control member 30 in which the support portion 31 and the projecting portions 32 are integrated can be formed by press working a thin-walled metal material having a thickness of 1.0 mm to 3.0 mm. However, the projecting portions 32 may be formed as separate bodies from the support portion 31, and thereafter may be fixed to the support portion 31 by welding or the like.

Figure 3:
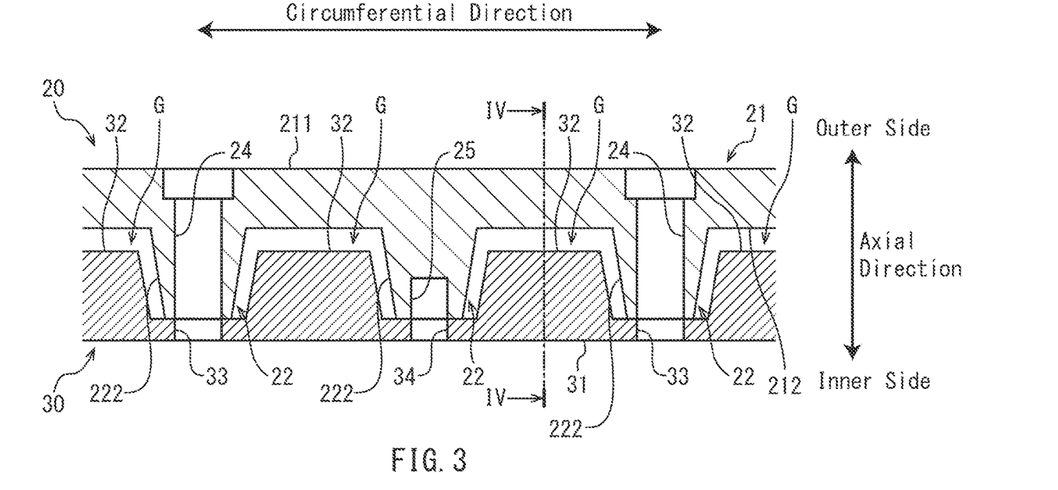
FIG. 3 is a cross-sectional view along a line in FIG. 2.
Figure 4:
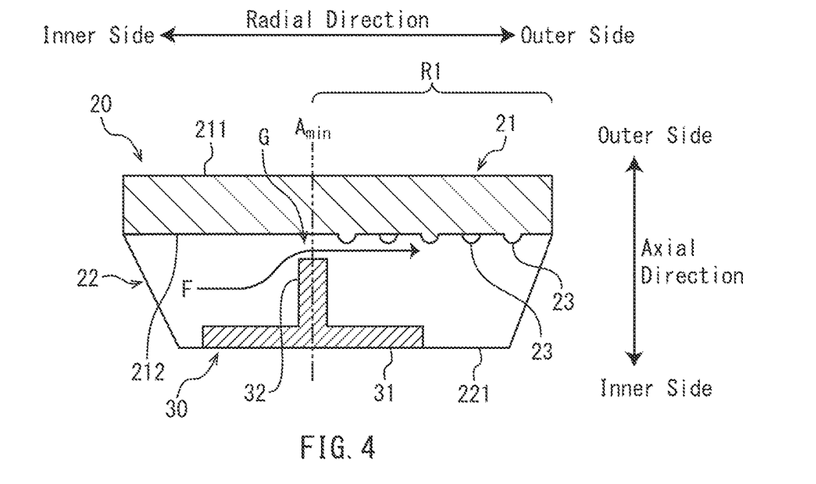
FIG. 4 is a cross-sectional view along a line IV-IV in FIG. 3.

FIG. 3 is a cross-sectional view taken along a line of the brake disk 20 and the control member 30 illustrated in FIG. 2. Specifically, FIG. 3 is a partial cross-sectional view illustrating a cross section of a part of the brake disk 20 and the control member 30 taken along the circumferential direction and the axial direction. FIG. 4 is a cross-sectional view taken along a line IV-IV of the brake disk 20 and the control member 30 illustrated in FIG. 3, and is a cross-sectional view of the brake disk 20 and the control member 30 that is taken along the radial direction and the axial direction. In FIG. 3 and FIG. 4, the features of the brake disk 20 and the control member 30 are schematically illustrated.

Referring to FIG. 3, each of the projecting portions 32 projects from the support portion 31 toward the rear surface 212 of the disk main body 21. The front end of each projecting portion 32 does not come in contact with the rear surface 212 of the disk main body 21. In the example of the present embodiment, both ends in the circumferential direction of each projecting portion 32 also do not come in contact with side faces 222 of the respective fins 22. Therefore, a gap G having an approximately U-shape as viewed in the radial direction is formed between each of the projecting portions 32 and the brake disk 20.

Referring to FIG. 4, the gap G has a minimum opening portion $A_{min}$. The minimum opening portion $A_{min}$ is a portion where, in the gap G formed between each of the projecting portions 32 and the brake disk 20, the area of the cross section along the circumferential direction and the axial direction is smallest. In other words, at the minimum opening portion $A_{min}$, an opening area of a ventilation passage defined by the rotating member 10 (FIG. 1), the fins 22 that are adjacent in the circumferential direction, and the disk main body 21 is smallest. The sum of the areas (gross area) of the minimum opening portions $A_{min}$ can be made, for example, 18,000 mm$^2$ or less. The gross area of the minimum opening portions $A_{min}$ can be made, for example, 2,500 mm$^2$ or more.

The aforementioned plurality of convex portions 23 are provided in a region R1 which, on the surface of the brake disk 20, is a region located further on the outer side in the radial direction than the minimum opening portion $A_{min}$. In the example of the present embodiment, the convex portions 23 are provided on the rear surface 212 of the disk main body 21.

The size of each of the convex portions 23 can be appropriately determined. Although not particularly limited, the height (dimension in the axial direction) of each of the convex portions 23 can be made, for example, 2 mm to 5 mm. In a case where each of the convex portions 23 has a hemispherical shape or a semispheroidal shape, the diameter or major axis (dimension in the radial direction) of each of the convex portions 23 can be made, for example, 4 mm to 50 mm.

The number of the convex portions 23 can also be appropriately determined. For example, between each pair of the fins 22 which are adjacent in the circumferential direction, at least five of the convex portions 23 can be provided in the region R1 that is further on the outer side in the radial direction than the minimum opening portion $A_{min}$.

[Advantageous Effects]

In the brake disk unit 100 according to the present embodiment, the projecting portions 32 of the control member 30 are arranged between the respective fins 22 that are adjacent in the circumferential direction. As a result, the cross-sectional area of the ventilation passage defined by the rotating member 10, the adjacent fins 22, and the disk main body 21 becomes partially smaller. In other words, as a result of the projecting portion 32 of the control member 30 being arranged within the ventilation passage, the minimum opening portion $A_{min}$ of the ventilation passage is formed. Thus, the airflow rate within the ventilation passage can be limited, and aerodynamic sound that is generated when the railway vehicle is traveling can be reduced.

On the other hand, in the present embodiment, the projecting portion 32 of the control member 30 projects from the rotating member 10 side toward the disk main body 21, and forms the minimum opening portion $A_{min}$ along the disk main body 21 and the fins 22. By this means, as indicated by an arrow F in FIG. 4, air that has passed through the minimum opening portion $A_{min}$ flows along the brake disk 20, and consequently the flow velocity of air near the surface of the brake disk 20 can be increased. Hence, a decrease in the cooling performance of the brake disk 20 during braking can be suppressed.

In addition, according to the present embodiment, the plurality of convex portions 23 are provided in the region R1 which, on the surface of the brake disk 20, is located further on the outer side (wake side) in the radial direction than the minimum opening portion $A_{min}$ and which is a region at which the flow velocity of air is high. By this means, a thermal boundary layer formed on the surface of the brake disk 20 can be made thin, and a heat transfer coefficient between air that passes through the ventilation passage and the brake disk 20 can be increased. Further, the surface area of the brake disk 20 is enlarged by the plurality of convex portions 23. Therefore, the cooling performance of the brake disk 20 during braking can be maintained at a high level. Hence, even though the airflow rate within the ventilation passage is limited in order to reduce aerodynamic sound, the cooling performance of the brake disk 20 can be secured.

Second Embodiment

Figure 5:
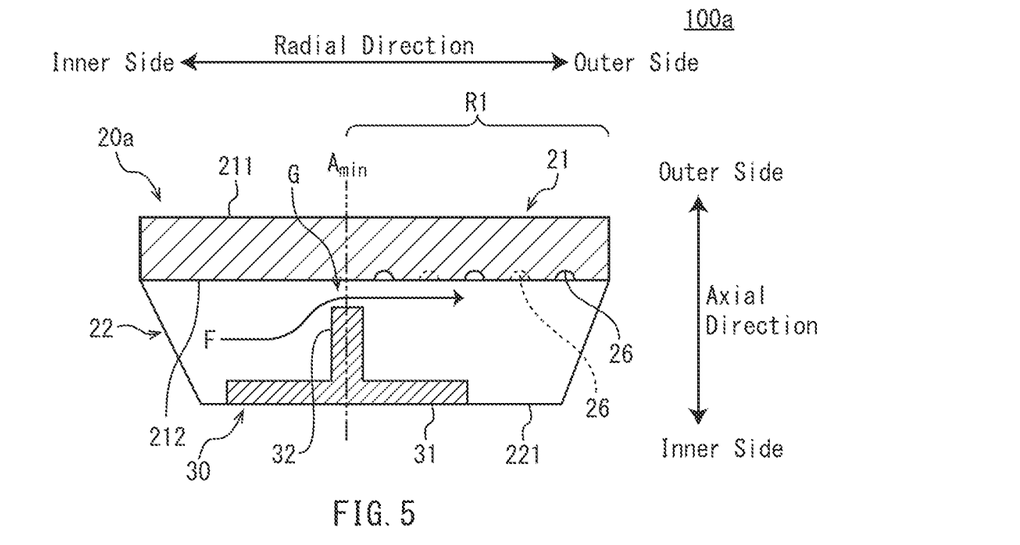
FIG. 5 is a view illustrating a cross section of a brake disk and a control member included in a brake disk unit according to a second embodiment taken along the radial direction and axial direction.

FIG. 5 is a schematic cross-sectional view illustrating a cross section of a brake disk unit 100a according to a second embodiment that is taken along the radial direction and axial direction. However, in FIG. 5, only a brake disk 20a and the control member 30 are illustrated, and illustration of the rotating member 10 is omitted.

As illustrated in FIG. 5, in the present embodiment a plurality of concave portions 26 are provided in the region R1 which, on the surface of the brake disk 20a, is located further on the outer side in the radial direction than the minimum opening portion $A_{min}$. The concave portions 26 are formed in the rear surface 212 of the disk main body 21. A plurality of the concave portions 26 are arranged between each pair of the fins 22 that are adjacent in the circumferential direction.

Each of the concave portions 26 has, for example, a hemispherical shape or a semispheroidal shape. Although each concave portion 26 may have the same shape as the other concave portions 26, each concave portion 26 may also have a different shape to the other concave portions 26. Similarly to the convex portions 23 (FIG. 4) described in the first embodiment, the number and size of the concave portions 26 can be set as appropriate.

In a case where the plurality of concave portions 26 are provided in the disk main body 21 as in the present embodiment also, a thermal boundary layer formed at the surface of the brake disk 20a becomes thin in the region R1 that is further on the outer side in the radial direction than the minimum opening portion $A_{min}$. Hence, the heat transfer coefficient between air that passes through the ventilation passage and the brake disk 20a can be increased. Further, the surface area of the brake disk 20a is enlarged by the plurality of concave portions 26. Therefore, the cooling performance of the brake disk 20a during braking can be maintained at a high level.

However, from a production viewpoint, it is preferable to provide the convex portions 23 on the surface of the brake disk as in the first embodiment. Specifically, for example, in the case of producing the brake disk by forging, if the concave portions 26 are to be formed in the surface of the brake disk, it will be necessary to form convex portions that correspond to the concave portions 26 on the forging die. However, it is considered that the convex portions of the die would be worn or damaged relatively quickly by repeated forging. On the other hand, in a case where the convex portions 23 are provided on the surface of the brake disk, since no convex portions will be present on the forging die, it will be difficult for wearing or damage of the die to occur. Hence, from the viewpoint of the service life of the die, preferably only the convex portions 23 are provided on the surface of the brake disk.

Third Embodiment

Figure 6:
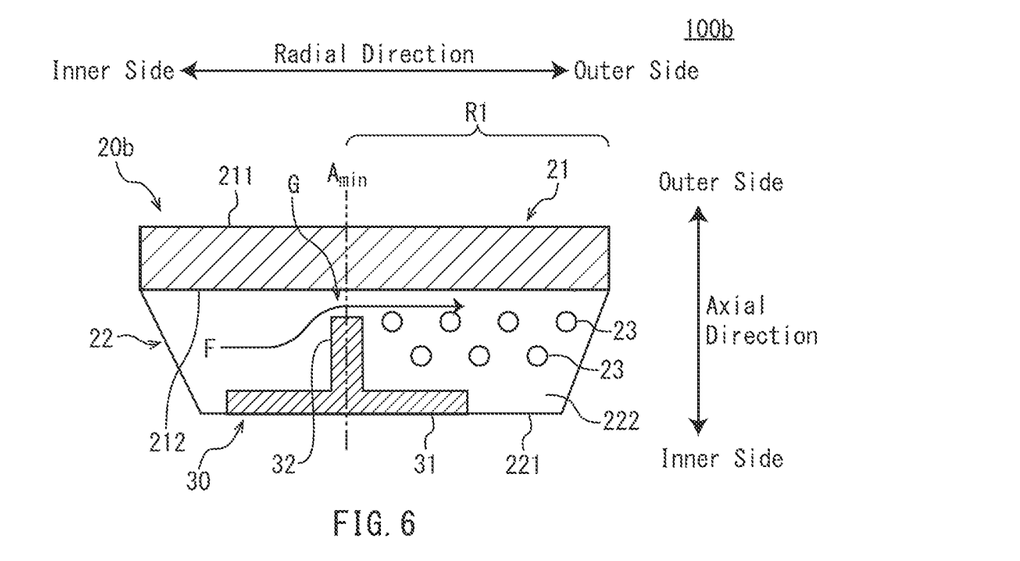
FIG. 6 is a view illustrating a cross section of a brake disk and a control member included in a brake disk unit according to a third embodiment taken along the radial direction and axial direction.
Figure 7:
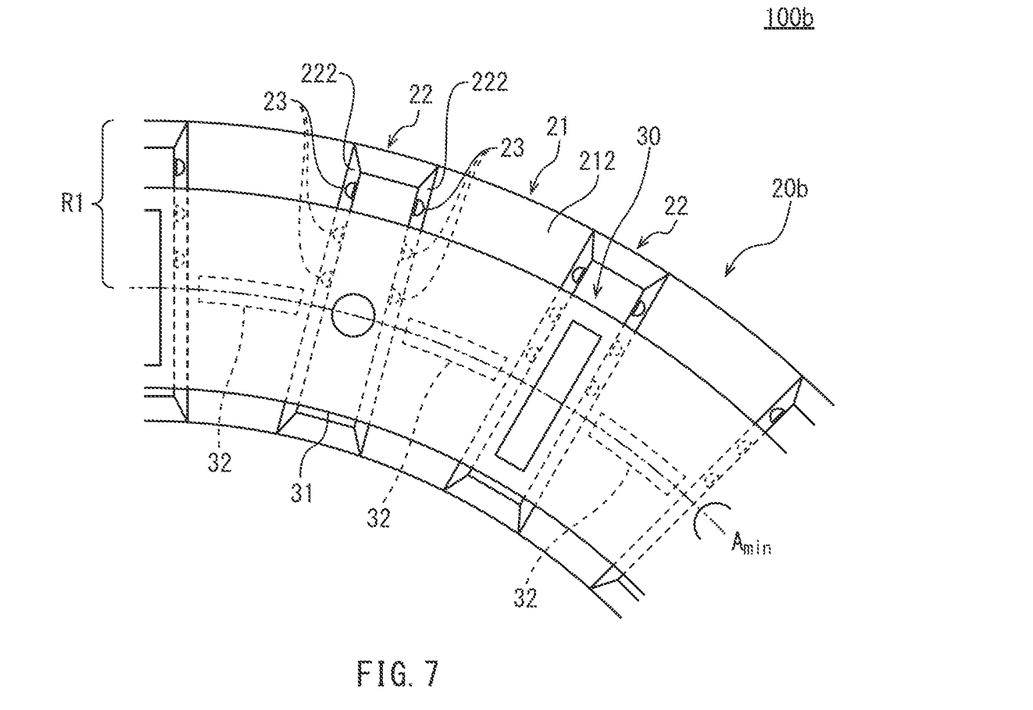
FIG. 7 is a rear surface view of the brake disk and control member illustrated in FIG. 6.

FIG. 6 is a schematic cross-sectional view illustrating a cross section of a brake disk unit 100b according to a third embodiment that is taken along the radial direction and axial direction. However, in FIG. 6, only a brake disk 20b and the control member 30 are illustrated, and illustration of the rotating member 10 is omitted. FIG. 7 is a rear surface view of the brake disk 20b and the control member 30.

Referring to FIG. 6 and FIG. 7, the brake disk unit 100b according to the present embodiment differs from the first embodiment in the respect that the plurality of convex portions 23 are provided on the fins 22, and not on the rear surface 212 of the disk main body 21. The plurality of the convex portions 23 are formed on both of the side faces 222 of each fin 22, in the region R1 that is further on the outer side in the radial direction than the minimum opening portion $A_{min}$.

In a case where the plurality of convex portions 23 are provided on the fins 22 as in the present embodiment also, a thermal boundary layer formed at the surface of the brake disk 20b becomes thin in the region R1 that is further on the outer side in the radial direction than the minimum opening portion $A_{min}$. Hence, the heat transfer coefficient between air that passes through the ventilation passage and the brake disk 20b can be increased. Further, the surface area of the brake disk 20b is enlarged by the plurality of convex portions 23. Therefore, the cooling performance of the brake disk 20b during braking can be maintained at a high level.

Fourth Embodiment

Figure 8:
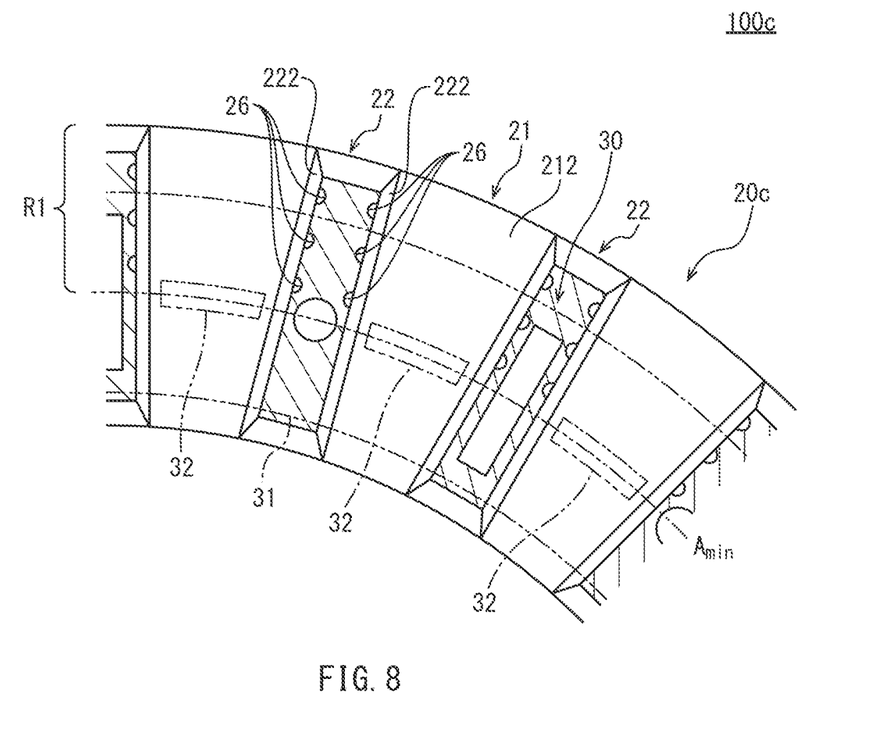
FIG. 8 is a rear surface view of a brake disk included in a brake disk unit according to a fourth embodiment.

FIG. 8 is a rear surface view that schematically illustrates a brake disk 20c included in a brake disk unit 100c according to a fourth embodiment. FIG. 8 illustrates a cross section of each fin 22 of the brake disk 20c taken along a plane perpendicular to the axial direction.

Referring to FIG. 8, in the brake disk unit 100c according to the present embodiment, instead of the plurality of convex portions 23 of the third embodiment, a plurality of concave portions 26 are provided in the fins 22. The plurality of the concave portions 26 are formed in the side faces 222 of each fin 22, in the region R1 that is further on the outer side in the radial direction than the minimum opening portion $A_{min}$.

In a case where the plurality of concave portions 26 are provided in the fins 22 as in the present embodiment also, a thermal boundary layer formed at the surface of the brake disk 20c becomes thin in the region R1 that is further on the outer side in the radial direction than the minimum opening portion $A_{min}$. Hence, the heat transfer coefficient between air that passes through the ventilation passage and the brake disk 20c can be increased. Further, the surface area of the brake disk 20c is enlarged by the plurality of concave portions 26. Therefore, the cooling performance of the brake disk 20c during braking can be maintained at a high level.

In the third and fourth embodiments, the convex portions 23 or concave portions 26 are formed on each of the side faces 222 of the fins 22, and not on the rear surface 212 of the disk main body 21. However, from the viewpoint of ease of production, it is preferable that the convex portions 23 or the concave portions 26 are formed on the rear surface 212 of the disk main body 21 as in the first and second embodiments.

Fifth Embodiment

Figure 9:
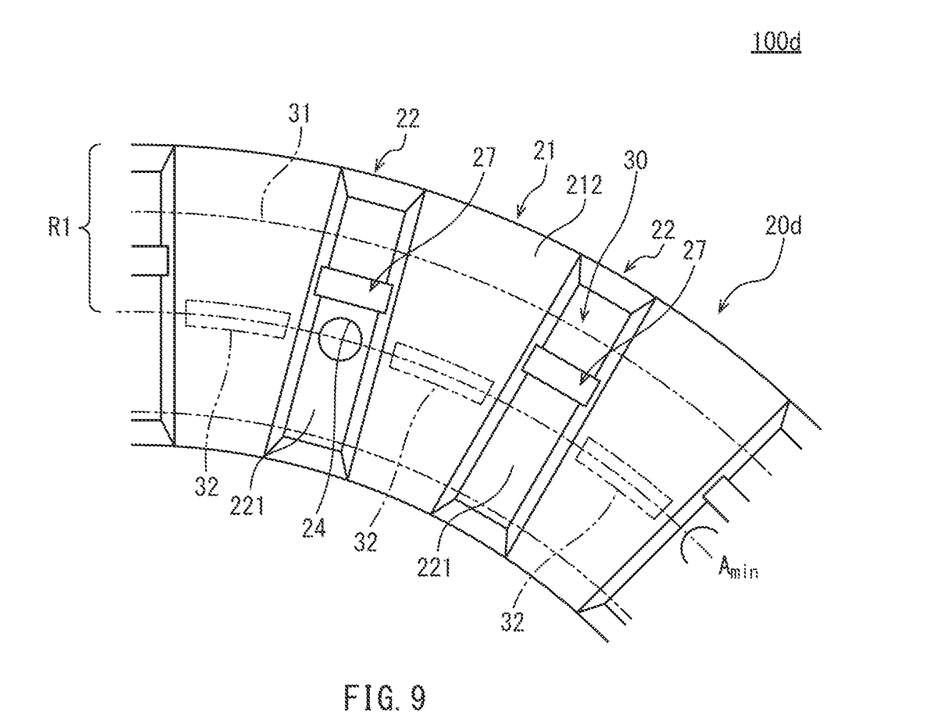
FIG. 9 is a rear surface view of a brake disk included in a brake disk unit according to a fifth embodiment.

FIG. 9 is a rear surface view that schematically illustrates a brake disk 20d included in a brake disk unit 100d according to a fifth embodiment.

As illustrated in FIG. 9, in the brake disk unit 100d according to the present embodiment, a groove-shaped concave portion 27 is formed in each fin 22. The concave portions 27 have a shape that is concave from the top face 221 of the fin 22 to the disk main body 21 side, and transect the fin 22 in the circumferential direction. In the example of the present embodiment, the concave portion 27 is arranged at a position that is further on the outer side in the radial direction than the fastening hole 24. However, it suffices that the position of the concave portion 27 is further on the outer side in the radial direction than the minimum opening portion $A_{min}$, and the position of the concave portion 27 can be appropriately adjusted according to the position of the projecting portion 32 of the control member 30.

In a case where the groove-shaped concave portion 27 is provided in each of the fins 22 as in the present embodiment also, a thermal boundary layer formed at the surface of the brake disk 20d becomes thin in the region R1 that is further on the outer side in the radial direction than the minimum opening portion $A_{min}$. Hence, the heat transfer coefficient between air that passes through the ventilation passage and the brake disk 20d can be increased. Further, if the groove-shaped concave portions 27 are provided, the surface area of the brake disk 20d can be further enlarged. Hence, the cooling performance of the brake disk 20d during braking can be improved.

Sixth Embodiment

Figure 10:
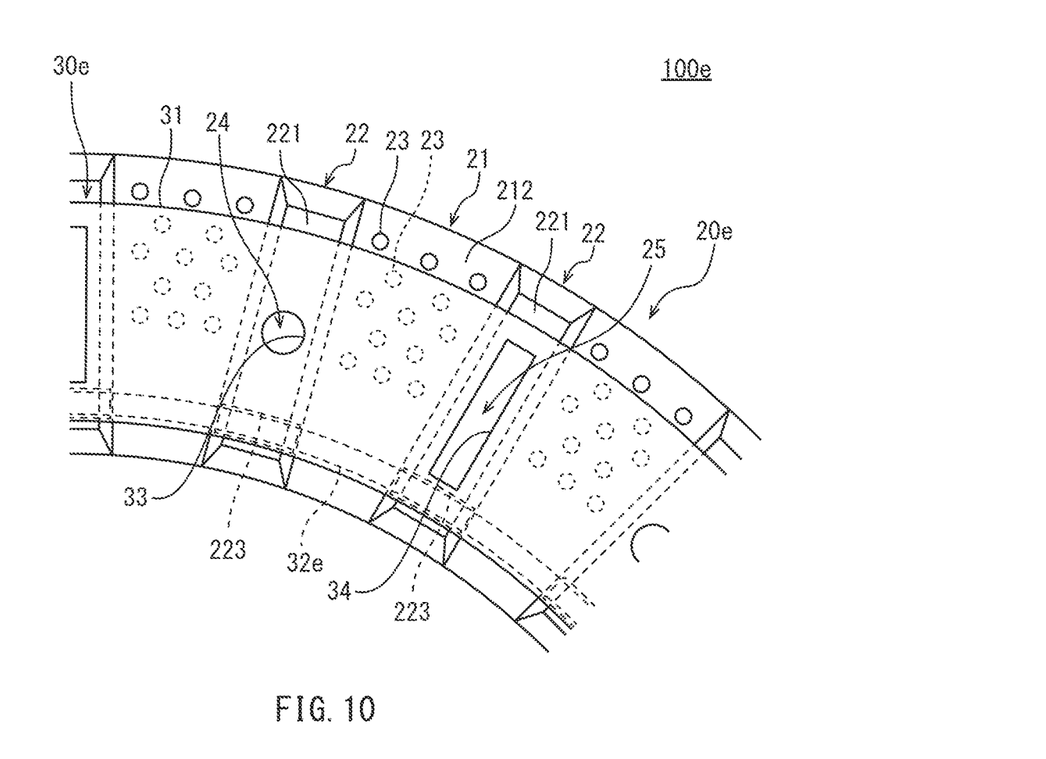
FIG. 10 is a rear surface view of a brake disk and a control member included in a brake disk unit according to a sixth embodiment.

FIG. 10 is a rear surface view that schematically illustrates a brake disk 20e and a control member 30e included in a brake disk unit 100e according to a sixth embodiment.

Figure 11:
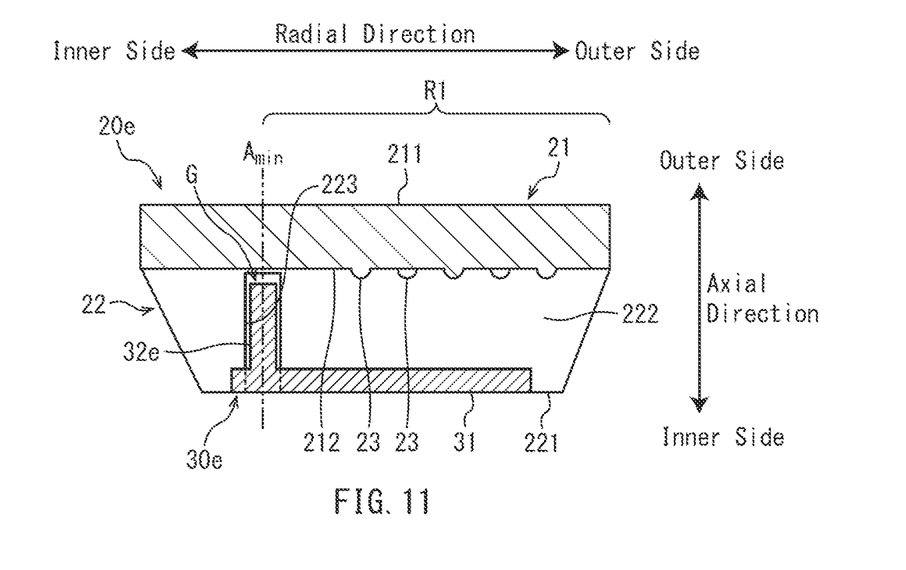
FIG. 11 is a view illustrating a cross section of the brake disk and the control member illustrated in FIG. 10 taken along the radial direction and axial direction.

FIG. 11 is a schematic cross-sectional view illustrating a cross section of the brake disk 20e and the control member 30e illustrated in FIG. 10 taken along the radial direction and the axial direction.

Referring to FIG. 10, in the respective fins 22 provided in the brake disk 20e, a groove 223 is formed for accommodating a part of a projecting portion 32e of the control member 30e. The groove 223 of each fin 22 transects the relevant fin 22 in the circumferential direction.

In the example of the present embodiment, the groove 223 of each fin 22 is arranged on the inner side of the disk main body 21 in the radial direction. More specifically, each groove 223 is arranged further on the inner side in the radial direction than the fastening hole 24 or the key groove 25 in a manner so that the groove 223 does not overlap with the fastening hole 24 or the key groove 25 provided in the fin 22. However, in the fins 22 which have the key groove 25, in a case where a key (not illustrated) that is inserted into the key groove 25 does not interfere with the projecting portion 32e inside the groove 223, the groove 223 may partially overlap with the key groove 25.

In the control member 30e, the projecting portion 32e passes through the grooves 223 and extends in the circumferential direction from one to the other of the fins 22 that are adjacent. In the example of the present embodiment, the projecting portion 32e passes through all of the grooves 223 to extend in the circumferential direction. In other words, the projecting portion 32e has an annular shape that is substantially concentric with the disk main body 21. Similarly to the other embodiments, the projecting portion 32e may be formed integrally with the support portion 31, or may be formed as a separate body from the support portion 31 and thereafter fixed to the support portion 31 by welding or the like.

Referring to FIG. 11, as described above, the groove 223 is provided in each fin 22 of the brake disk 20e. The groove 223 is a portion formed as a recess from the top face 221 of the fin 22 to the disk main body 21 side. However, in order to secure the thermal capacity of the disk main body 21, the groove 223 does not penetrate into the disk main body 21. In other words, the bottom face of the groove 223 is substantially coplanar with the rear surface 212 of the disk main body 21, or is located further on the inner side in the axial direction than the rear surface 212.

The projecting portion 32e of the control member 30e projects from the support portion 31 toward the rear surface 212 of the disk main body 21, similarly to the other embodiments. However, unlike the other embodiments, the projecting portion 32e straddles the adjacent fins 22 and extends in the circumferential direction. One part of the projecting portion 32e is arranged between the fins 22 that are adjacent in the circumferential direction. The other part of the projecting portion 32e is arranged within the groove 223 of each fin 22. A gap G is formed between the brake disk 20e and the part of the projecting portion 32e arranged between the adjacent fins 22. Between the fins 22 that are adjacent in the circumferential direction, the gap G is formed between the projecting portion 32e and the rear surface 212 of the disk main body 21, and for example has an approximately linear shape as viewed in the radial direction. Similarly to the other embodiments, the gap G has a minimum opening portion $A_{min}$.

In the gap G between the projecting portion 32e and the rear surface 212 of the disk main body 21, which is formed between the fins 22, the minimum opening portion $A_{min}$ is a portion at which a cross section along the circumferential direction and the axial direction is smallest. The distance in the axial direction from the front end of the projecting portion 32e to the rear surface 212 of the disk main body 21 is, for example, 0.5 mm to 4.5 mm. On the surface of the brake disk 20e, a plurality of the convex portions 23 are provided in a region R1 that is located further on the outer side in the radial direction than the minimum opening portion $A_{min}$. Similarly to the first embodiment, the convex portions 23 are arranged on the rear surface 212 of the disk main body 21. A plurality of concave portions 26 that are similar to the concave portions 26 of the second embodiment may be provided in the rear surface 212 of the disk main body 21 instead of the convex portions 23.

In the present embodiment, because the projecting portion 32e of the control member 30e is arranged to straddle the fins 22 that are adjacent in the circumferential direction, the minimum opening portion $A_{min}$ is formed along the disk main body 21 between the adjacent fins 22. Air that flows through the minimum opening portion $A_{min}$ and whose flow velocity is thereby increased will flow along the rear surface 212 of the disk main body 21. In the region R1 located further on the outer side (wake side) in the radial direction than the minimum opening portion $A_{min}$, the convex portions 23 or concave portions 26 are formed on the rear surface 212 of the disk main body 21. Hence, a thermal boundary layer that is formed at the surface of the brake disk 20e can be made thin, and the heat transfer coefficient between air and the brake disk 20e can be increased. Further, the surface area of the brake disk 20e can be enlarged by the convex portions 23 or the concave portions 26. As a result, the cooling performance of the brake disk 20e during braking can be improved.

In the above first to fifth embodiments, one of the projecting portions 32 of the control member 30 is provided between each pair of the fins 22 that are adjacent in the circumferential direction. In this case, when producing the control member 30, it is necessary to adjust the position and dimensions in the circumferential direction and the like of the projecting portions 32 relatively strictly so that the projecting portions 32 do not interfere with the respective fins 22. In contrast, in the present embodiment, a part of the projecting portion 32e of the control member 30e is arranged between the fins 22 that are adjacent in the circumferential direction. In other words, the projecting portion 32e passes through each fin 22 and extends in the circumferential direction. In each fin 22, the groove 223 corresponding to the projecting portion 32e is formed so that the projecting portion 32e substantially does not interfere with the respective fins 22. Consequently, when producing the control member 30e, it is not necessary to strictly adjust the position or dimensions in the circumferential direction or the like of the projecting portion 32e. Hence, production of the control member 30e can be performed relatively simply, and the labor and cost required for processing the control member 30e can be reduced.

For example, in a case where the control member 30e is composed of a thin-walled metal material, when the railway vehicle is traveling at a high speed, there is a possibility that the projecting portion 32e will deform outward in the radial direction of the brake disk 20e due to the influence of a centrifugal force and the airflow, and that the minimum opening portion $A_{min}$ will become larger and the effect of reducing aerodynamic sound will not be stably obtained. However, in the present embodiment, because a part of the projecting portion 32e is arranged within the groove 223 of each fin 22, deformation of the projecting portion 32e can be restrained by the grooves 223. Hence, even when the control member 30e is composed of a thin-walled material, fluctuations in the minimum opening portion $A_{min}$ while the railway vehicle is traveling can be suppressed, and aerodynamic sound can be stably reduced. Further, by making the control member 30e with a thin-walled material, an increase in weight can be prevented and favorable manufacturability can be ensured.

In the present embodiment, the groove 223 for arranging the projecting portion 32e in is provided in each fin 22 of the brake disk 20e. By this means the surface area of the brake disk 20e is enlarged, and therefore the cooling performance of the brake disk 20e can be improved. In addition, since the flow velocity of air that enters the space between the front end of the projecting portion 32e and the bottom face of each groove 223 is high, as long as the length of the front end of the projecting portion 32e in the radial direction is secured to a certain extent, the region where the flow velocity of the air is high will expand in the radial direction. Therefore, the heat exchange amount between the air and the bottom face of each groove 223 can be increased. In other words, the heat dissipation amount from the bottom face of each groove 223 to the air can be increased. Hence, the cooling performance of the brake disk 20e can be further improved. Preferably the length of the front end of the projecting portion 32e in the radial direction is, for example, one twentieth or more the length (on the disk main body 21 side) of the fin 22 in the radial direction.

Whilst embodiments according to the present disclosure have been described above, the present disclosure is not limited to the above embodiments, and various changes are possible within a range that does not deviate from the gist of the present disclosure.

For example, in the respective embodiments described above, on the surface of the brake disk, one of the convex portions 23, the concave portions 26 and the concave portions 27 are provided in the region R1 that is located further on the outer side in the radial direction than the minimum opening portion $A_{min}$. However, two or more kinds of portions among the convex portions 23, the concave portions 26 and the concave portions 27 may be intermixed in the region R1.

In the above first to fourth embodiments and the sixth embodiment, the convex portions 23 or the concave portions 26 are provided on either one of the rear surface 212 of the disk main body 21 and the side face 222 of each fin 22. However, in the region R1 that is located further on the outer side in the radial direction than the minimum opening portion $A_{min}$, at least one among the convex portions 23 and the concave portions 26 may be provided on both the rear surface 212 of the disk main body 21 and the side face 222 of each fin 22.

Figure 12:
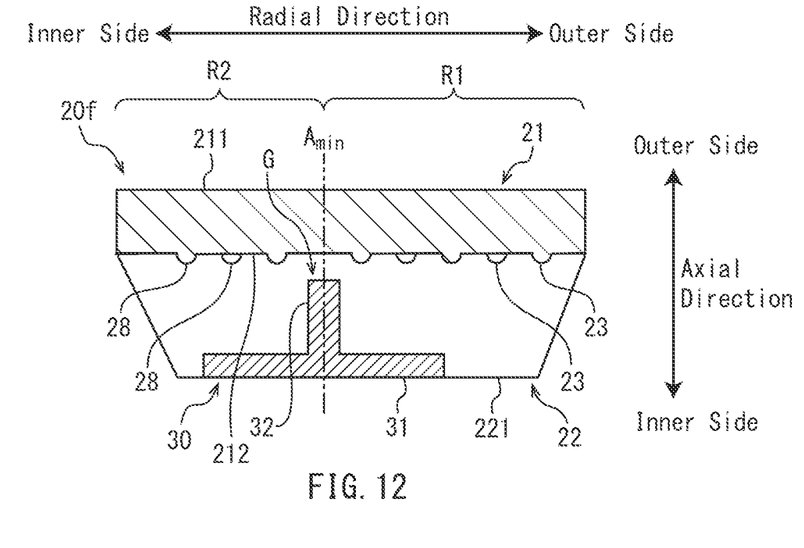
FIG. 12 is a view for describing a modification of the brake disk unit according to the first embodiment.
Figure 13:
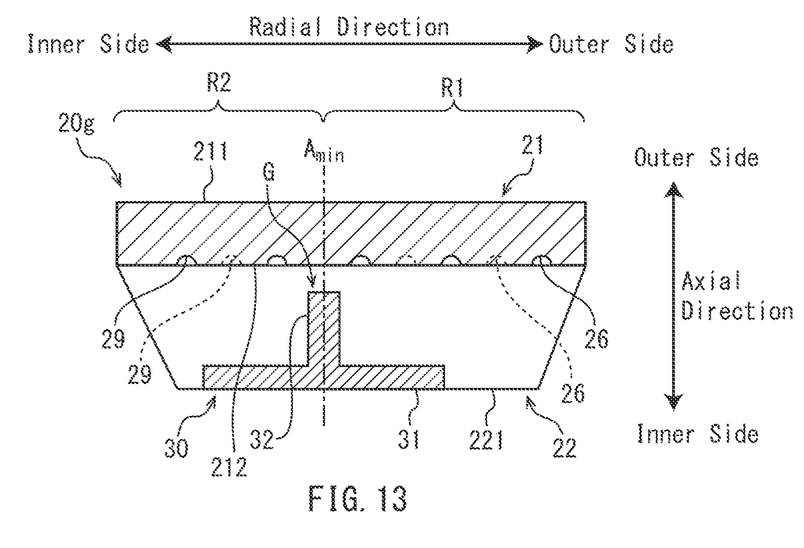
FIG. 13 is a view for describing a modification of the brake disk unit according to the second embodiment.

In the above first to fourth embodiments and the sixth embodiment, on the surface of the brake disk, the convex portions 23 or the concave portions 26 are provided only in the region R1 that is located further on the outer side in the radial direction than the minimum opening portion $A_{min}$. However, convex portions or concave portions can also be provided in a region other than the region R1. For example, as illustrated in FIG. 12, on the surface of a brake disk 20f, a plurality of convex portions 28 may be provided on the rear surface 212 of the disk main body 21 in a region R2 that is located further on the inner side in the radial direction than the minimum opening portion $A_{min}$. In other words, convex portions can be formed across the entire rear surface 212 of the disk main body 21 in a manner so that the convex portions do not interfere with the projecting portion 32 of the control member 30. The structure of the convex portions 28 can be made substantially the same as the structure of the convex portions 23. Further, for example, as illustrated in FIG. 13, on the surface of a brake disk 20g, a plurality of concave portions 29 may be provided in the rear surface 212 of the disk main body 21 in a region R2 that is located further on the inner side in the radial direction than the minimum opening portion $A_{min}$. In other words, concave portions can be formed across the entire rear surface 212 of the disk main body 21. The structure of the concave portions 29 can be made substantially the same as the structure of the concave portions 26.

In the examples illustrated in FIG. 12 and FIG. 13, in the region R2 located further on the inner side in the radial direction than the minimum opening portion $A_{min}$, the convex portions 28 or the concave portions 29 are formed on the rear surface 212 of the disk main body 21. However, in the region R2 on the inner side in the radial direction, the convex portions 28 or concave portions 29 can also be formed on the side face of each fin 22 instead of or in addition to the rear surface 212 of the disk main body 21. Further, the convex portions 28 and the concave portions 29 may be intermixed in the region R2 on the inner side in the radial direction, similarly to the region R1 on the outer side.

In the respective embodiments described above, the shape of the projecting portions 32 and 32e of the control members 30 and 30e can be appropriately changed. For example, the projecting portions 32 and 32e may tilt to the outer side in the radial direction as the projecting portions approach the disk main body 21, or a front end portion thereof may curve toward the outer side in the radial direction. Alternatively, the projecting portions 32 and 32e may have a roughly triangular shape or roughly quadrilateral shape when viewed in a cross section along the radial direction and the axial direction. In this case, the projecting portions 32 and 32e may be formed hollow or may be formed solid.

Although in the first to fifth embodiments that are described above each of the projecting portions 32 of the control member 30 are arranged in the vicinity of the center in the radial direction of the disk main body 21, the position of the projecting portions 32 is not limited thereto. The projecting portions 32 may be arranged on the outer side of the disk main body 21 in the radial direction or may be arranged on the inner side of the disk main body 21 in the radial direction.

In the above sixth embodiment, the projecting portion 32e of the control member 30e is arranged on the inner side of the disk main body 21 in the radial direction, and the grooves 223 corresponding to the projecting portion 32e are formed in the top face 221 of the respective fins 22. However, the positions of the projecting portion 32e and the grooves 223 are not limited thereto. For example, in a case where the projecting portion 32e is arranged further on the inner side in the radial direction, the groove 223 can be formed in each fin 22 so that a part or all of the groove 223 is located further on the inner side in the radial direction than the top face 221 of the fin 22. Further, for example, in each fin 22, by forming the groove 223 at a position that is further on the outer side in the radial direction than the fastening hole 24 or the key groove 25, the projecting portion 32e that straddles the plurality of fins 22 to extend in the circumferential direction can also be arranged on the outer side of the disk main body 21 in the radial direction.

In the above first to fifth embodiments, the support portion 31 of the control member 30 has a substantially annular plate shape. However, the support portion 31 may be divided into a plurality of parts in the circumferential direction. In other words, the support portion 31 may be composed of a plurality of arc-shaped components which each have one or more projecting portion 32. Similarly, in the control member 30e in the sixth embodiment, by dividing the support portion 31 into a plurality of parts in the circumferential direction together with the projecting portion 32e, a plurality of arc-shaped components can be formed. These arc-shaped components are arranged in contact with each other or at intervals in the circumferential direction between the rotating member 10 and the brake disk.

REFERENCE SIGNS LIST 100, 100a to 100e: Brake Disk Unit
10: Rotating Member
20, 20a to 20g: Brake Disk
21: Disk Main Body
22: Fin
223: Groove
23, 28: Convex Portion
26, 27, 29: Concave Portion
30, 30e: Control Member
31: Support Portion
32, 32e: Projecting Portion

The invention claimed is:

1. A brake disk unit for a railway vehicle, comprising:
a rotating member mounted to an axle of the railway vehicle;
a brake disk including an annular disk main body having a rear surface facing the rotating member, a plurality of fins arranged in a radial shape on the rear surface, and a plurality of first convex portions and/or a plurality of first concave portions formed on a surface of the brake disk; and
a control member that includes a plate-shaped support portion interposed between the rotating member and the plurality of fins, and a projecting portion at least a part of which is arranged between fins that are adjacent in a circumferential direction of the brake disk among the plurality of fins, the projecting portion projecting from the support portion toward the disk main body, the control member controlling an airflow rate between the fins that are adjacent;
wherein:
a gap is formed between the projecting portion and the brake disk; and
on the surface of the brake disk, the first convex portions and/or the first concave portions are provided further on an outer side in a radial direction of the brake disk than a minimum opening portion that is a portion of the gap at which an area of a cross section along the circumferential direction is smallest.

2. The brake disk unit according to claim 1, wherein:
the first convex portions and/or the first concave portions are provided on the rear surface of the disk main body.

3. The brake disk unit according to claim 2, wherein:
a groove is formed in each of the fins that are adjacent, the groove transecting the fin in the circumferential direction; and
the projecting portion passes through the groove and extends in the circumferential direction from one of the fins that are adjacent to the other of the fins that are adjacent.

4. The brake disk unit according to claim 3, wherein:
the first convex portions are provided on the surface of the brake disk.

5. The brake disk unit according to claim 3, wherein:
the brake disk further includes a plurality of second convex portions and/or a plurality of second concave portions that are formed on the surface;
wherein:
on the surface of the brake disk, the second convex portions and/or the second concave portions are provided further on an inner side in the radial direction than the minimum opening portion.

6. The brake disk unit according to claim 2, wherein:
the first convex portions are provided on the surface of the brake disk.

7. The brake disk unit according to claim 2, wherein:
the brake disk further includes a plurality of second convex portions and/or a plurality of second concave portions that are formed on the surface;
wherein:
on the surface of the brake disk, the second convex portions and/or the second concave portions are provided further on an inner side in the radial direction than the minimum opening portion.

8. The brake disk unit according to claim 1, wherein:
the first convex portions are provided on the surface of the brake disk.

9. The brake disk unit according to claim 8, wherein:
the brake disk further includes a plurality of second convex portions and/or a plurality of second concave portions that are formed on the surface;
wherein:
on the surface of the brake disk, the second convex portions and/or the second concave portions are provided further on an inner side in the radial direction than the minimum opening portion.

10. The brake disk unit according to claim 1, wherein:
the brake disk further includes a plurality of second convex portions and/or a plurality of second concave portions that are formed on the surface;
wherein:
on the surface of the brake disk, the second convex portions and/or the second concave portions are provided further on an inner side in the radial direction than the minimum opening portion.

* * * * *